June 24, 1930.  C. CRAIN  1,766,375
WHEEL ATTACHING DEVICE
Filed July 8, 1929
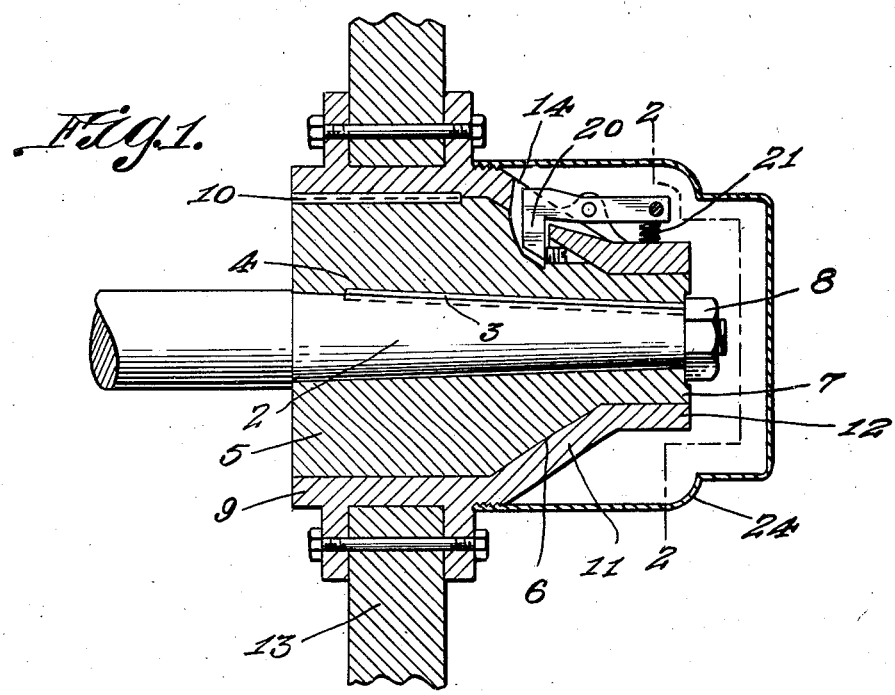
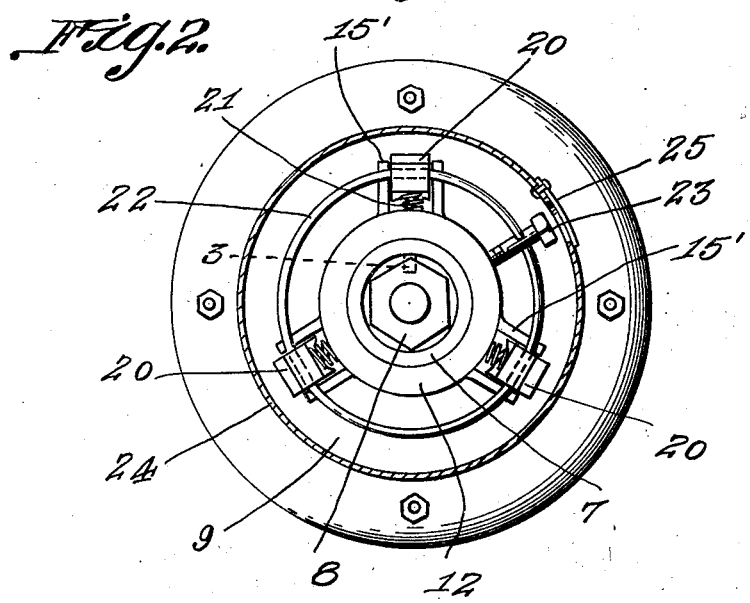
Clay Crain,
INVENTOR
BY Victor J. Evans
ATTORNEY Patented June 24, 1930

1,766,375

UNITED STATES PATENT OFFICE

CLAY CRAIN, OF WEST FRANKFORT, ILLINOIS

WHEEL-ATTACHING DEVICE

Application filed July 3, 1929. Serial No. 376,784.

My present invention has reference to a means for easily, quickly and securely attaching a wheel to an axle spindle and for likewise permitting of the ready removal of the wheel from the axle.

In carrying out my invention it is my purpose to removably fix upon the spindle of an axle a block in the nature of a boxing which has a flared end and which is designed to receive thereover and to have fixed thereto the hub of a wheel, the said boxing and the said hub being provided with alining notches or openings, the hub carrying pivotally supported spring influenced dogs to be received in the notches, together with means actuated by a rotatable member for swinging the dogs out of the notches in the boxes and thereby permit of the removal of the wheel from the box.

To the attainment of the foregoing the invention consists in the improvement hereinafter described and definitely claimed.

In the drawings:

Figure 1 is a substantially central longitudinal sectional view through the improvement.

Figure 2 is a sectional view approximately on the line 2—2 of Figure 1.

In the drawings, the numeral 1 designates an axle and 2 the spindle end thereof. The spindle is provided with a splineway for a key 3 that enters the key way 4 in the wall or bore of a cross sectionally rounded block or boxing 5. This boxing 5 has an inwardly flared portion 6, adjacent its outer and reduced end 7. The boxing is secured on the spindle by a nut 8 which is screwed on the end of the said spindle.

The vehicle hub is indicated by the numeral 9, and includes a cylindrical portion that is designed to be received over the enlarged and cylindrical portion of the block 5. This part of the hub carries a key-way which alines with a similar key-way in the boxing and there is received in these key-ways a key or spline 10. From its said rounded portion the hub is flared inwardly, as at 11, to overlie the flared portion 6 of the boxing 5, the said flared portion terminating in a reduced rounded extension 12 which surrounds the rounded end 7 of the boxing. The first mentioned and enlarged end of the hub is provided with spaced ears or sockets for the spokes 13 of the vehicle wheel and the flared portion 11 of the hub is provided at spaced intervals with openings 14 that register with notches 15 in the flared portion 6 of the boxing 5.

The said flared portion 11 of the hub, to the opposite sides of the openings 14 therein, is integrally formed with pairs of spaced ears 15' and between each pair of ears there is pivoted the straight end of a dog. The angle or engaging end of the dog is indicated by the numeral 20 and is swingable through the opening 14 and into the notches 15 and is designed to contact with the outer straight wall provided by the said notch 15. The dogs are influenced to such engagement through the medium of coil springs 21 which have one of their ends fixed to the straight end 12 of the hub and their second ends underlying the straight or lever portions of the dogs 20.

The straight ends of the dogs 20 have passed therethrough a spring ring 22. The ring is not only resilient but is of a tough character whereby the same when bent upon itself will return to initial position. The ring passes through an opening in a bolt member 23, the said bolt member being screwed in an opening in the part 12 of the hub 9.

There is screwed on the hub 9 to surround the dogs and to close the openings and notches a hub cap 24. This hub cap has an opening disposed opposite the head of the bolt 23, the said opening being closed by a pivotally supported spring cap plate 25. The opening closed by the cap plate is of a size sufficient to permit of the entrance of a socket therethrough and which socket engages the head of the bolt 23. By turning the bolt the section of the spring ring adjacent pin 23 will be caused to warp into S-shape, thereby decreasing the circumferential size of ring and causing the lever ends of the dogs to be swung toward the end 12 of the hub which will bring the active ends 20 of the dogs out of the notches 15, so that the wheel can be thus readily removed from the boxing and axle.

The simplicity and advantages of the construction will, it is thought, be readily apparent to those skilled in the art to which the invention relates so that further detailed description will not be required, but it is to be understood that I do not wish to be restricted to the precise details of construction herein set forth and, therefore, hold myself entitled to make such changes therefrom as fairly fall within the scope of what I claim.

Having described the invention, I claim:

A device for the purpose set forth, including a boxing having a flared portion receiving therethrough the spindle end of an axle which is removably fixed thereto, a wheel hub arranged over the boxing, keyed thereto and having a flared portion to overlie the flared portion of the boxing, said hub having equidistantly spaced openings therethrough and the boxing having notches alining with said openings, dogs pivotally secured to the hub and having their active ends received through the openings and in the notches of the boxing, spring means influencing the dogs to such position, an annular flexible element passing through the outer ends of the dogs and a rotatable pin through which the flexible element is received, as and for the purpose set forth.

In testimony whereof I affix my signature.

CLAY CRAIN.